(12) United States Patent
Liu (10) Patent No.: US 7,525,257 B2
(45) Date of Patent: Apr. 28, 2009

(54) DEVICE FOR DRIVING LIGHT SOURCES

(75) Inventor: Kuo-Chi Liu, Tu-Cheng (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/590,627

(22) Filed: Oct. 31, 2006

(65) Prior Publication Data
US 2007/0152605 A1 Jul. 5, 2007

(30) Foreign Application Priority Data
Dec. 30, 2005 (TW) .............................. 94147446 A (51) Int. Cl.
*H05B 41/16* (2006.01)
(52) U.S. Cl. .................. 315/277; 315/274; 315/312
(58) Field of Classification Search ......... 315/224–226, 315/276–277, 291, 312, 274
See application file for complete search history.

(56) References Cited

U.S. PATENT DOCUMENTS

| | | | |
|---|---|---|---|
| 6,784,627 B2 * | 8/2004 | Suzuki et al. ................ | 315/291 |
| 7,098,612 B2 * | 8/2006 | Huang et al. ................. | 315/318 |
| 2005/0099143 A1 * | 5/2005 | Kohno .......................... | 315/312 |
| 2006/0091829 A1 * | 5/2006 | Nishinosono ................ | 315/312 |
| 2006/0132059 A1 * | 6/2006 | Tanaka et al. ................ | 315/277 |
| 2006/0226796 A1 * | 10/2006 | Chuang ....................... | 315/312 |
| 2006/0290296 A1 * | 12/2006 | Lee et al. ..................... | 315/274 |
| 2007/0145911 A1 * | 6/2007 | Jin .............................. | 315/282 |

FOREIGN PATENT DOCUMENTS

CN 2554891 Y 6/2003

* cited by examiner

*Primary Examiner*—David Hung Vu
*Assistant Examiner*—Tung X Le (57) ABSTRACT

A driving device for driving a light source module (32) includes a first power stage circuit (30) and a first transformer circuit (31). The first transformer circuit is connected to the first power stage circuit, including a first transformer ($T_{31}$), a second transformer ($T_{32}$), a third transformer ($T_{33}$), and a fourth transformer ($T_{34}$). First inputs of primary windings of the first transformer and the fourth transformer, second inputs of primary windings of the second transformer and the third transformer are jointly connected to a positive output of the first power stage circuit, and second inputs of primary windings of the first transformer and the fourth transformer, first inputs of primary windings of the second transformer and the third transformer are jointly connected to a negative output of the first power stage circuit.

20 Claims, 7 Drawing Sheets

DEVICE FOR DRIVING LIGHT SOURCES

BACKGROUND

1. Field of the Invention

The present invention relates to electronic driving devices, and particularly to a device for driving a light source module, typically used for changing polarities of output voltages thereof.

2. Related Art

Generally, discharge lamps have been used as light sources of a liquid crystal display (LCD) panel, which need high voltage to light up the light sources. With large size LCD panels, a plurality of lamps is required for providing sufficient light intensity in the LCD panel.

Figure 6:
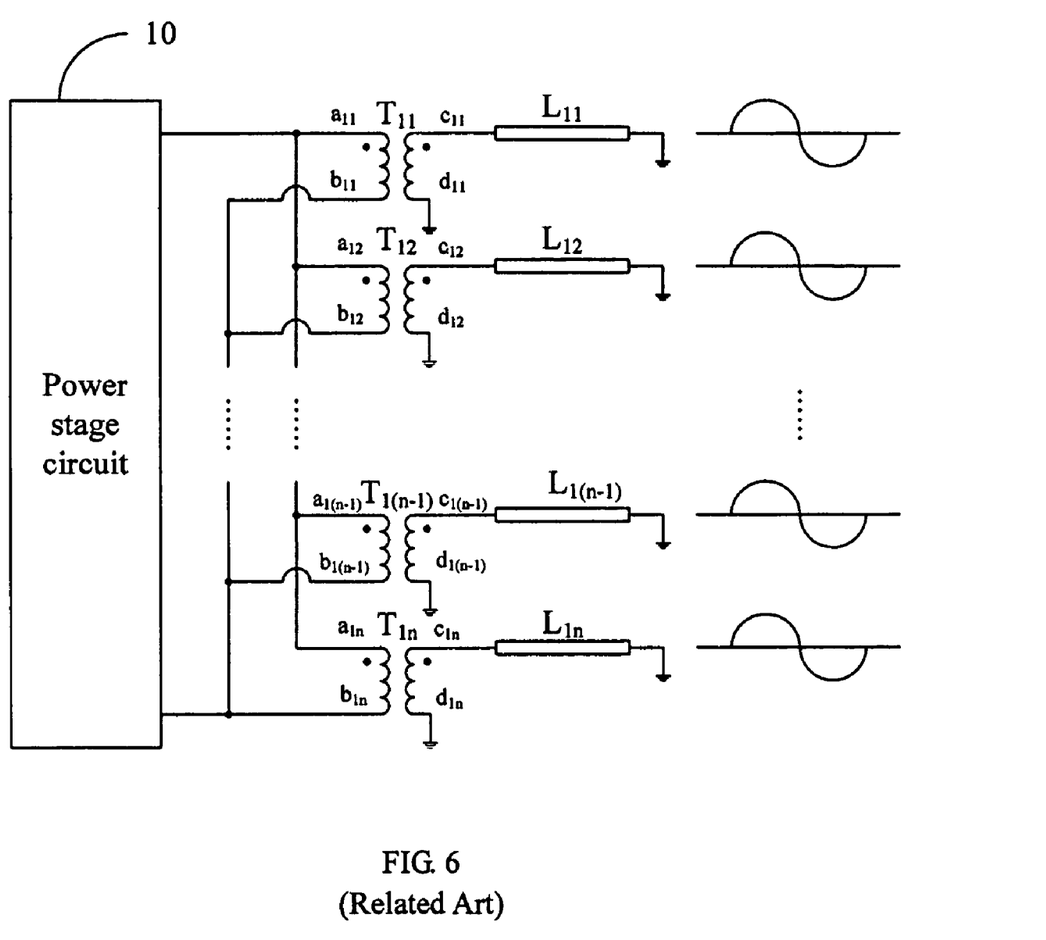
FIG. 6 is a schematic diagram of a conventional driving device.

FIG. 6 shows a schematic diagram of a conventional driving device connected to a light source module having a plurality of lamps $L_{1n}$ (n=1, 2, 3, ..., n). The conventional driving device includes a power stage circuit 10 and a plurality of transformers $T_{1n}$ (n=1, 2, 3, ..., n). Each of the transformers $T_{1n}$ (n=1, 2, 3, ..., n) includes a primary winding and a secondary winding. Each of the primary windings has a first input $a_{1n}$ (n=1, 2, 3, ..., n) and a second input $b_{1n}$ (n=1, 2, 3, ..., n), and each of secondary windings has a high voltage terminal $c_{1n}$ (n=1, 2, 3, ..., n) and a low voltage terminal $d_{1n}$ (n=1, 2, 3, ..., n). The first inputs $a_{1n}$ (n=1, 2, 3, ..., n) of the primary windings of the transformers $T_{1n}$ (n=1, 2, 3, ..., n) are jointly connected to one output of the power stage 10. Similarly, the second inputs $b_{1n}$ (n=1, 2, 3, ..., n) of the primary windings of the transformers $T_{1n}$ (n=1, 2, 3, ..., n) are jointly connected to another output of the power stage 10. The high voltage terminals $c_{1n}$ (n=1, 2, 3, ..., n) of the secondary winding of the transformers $T_{1n}$ (n=1, 2, 3, ..., n) are respectively connected to the lamps $L_{1n}$ (n=1, 2, 3, ..., n), and the low voltage terminals $d_{1n}$ (n=1, 2, 3, ..., n) of the secondary winding of the transformers $T_{1n}$ (n=1, 2, 3, ..., n) are grounded.

In the conventional driving device, because structures and the characteristics of the transformers $T_{1n}$ (n=1, 2, 3, ..., n) are the same, and because of the connections between the transformers $T_{1n}$ (n=1, 2, 3, ..., n), the power stage circuit 10 and the lamps $L_{1n}$ (n=1, 2, 3, ..., n) are also the same, each transformer $T_{1n}$ (n=1, 2, 3, ..., n) provides the same voltage in phase and the same voltage value to each of the lamps $L_{1n}$ (n=1, 2, 3, ..., n). However, currents flowing through the lamps $L_{1n}$ (n=1, 2, 3, ..., n) are unbalanced. The imbalanced currents deteriorate illumination uniformity of the LCD panel.

Figure 7:
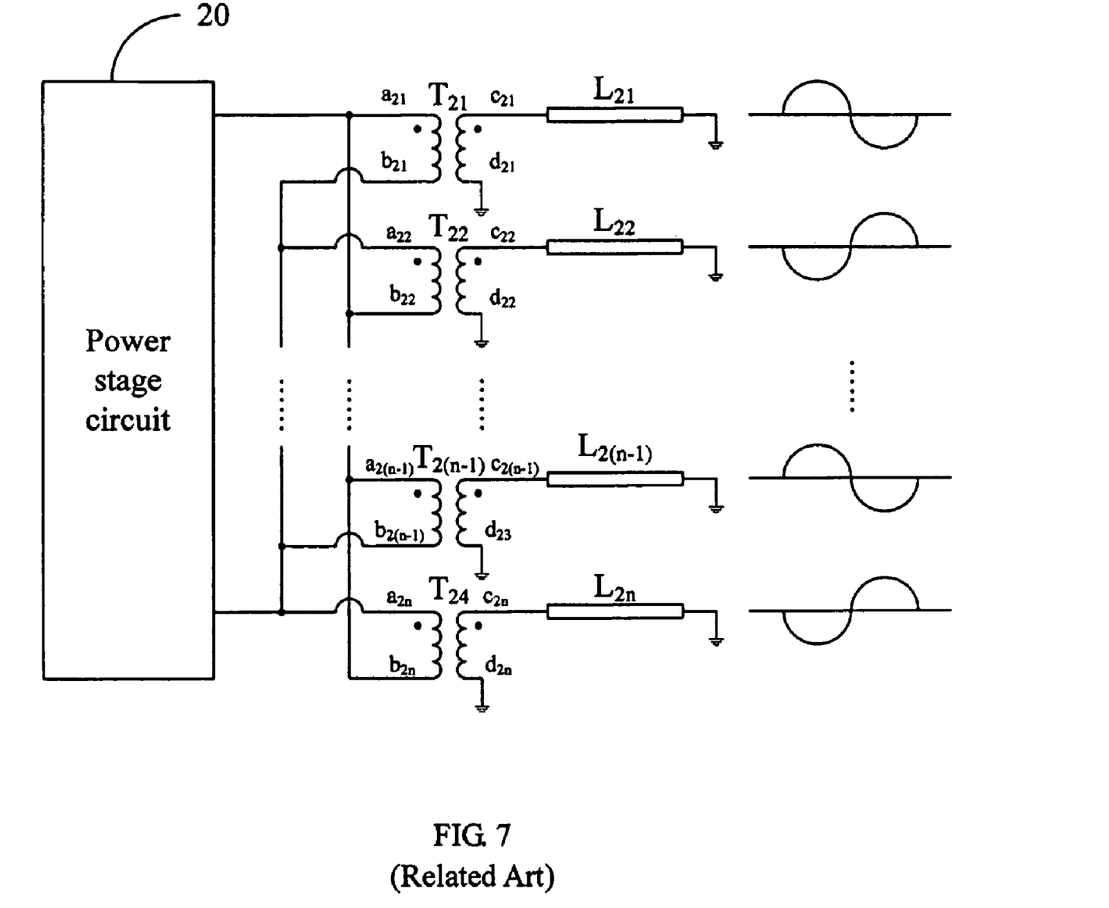
FIG. 7 is a schematic diagram of another conventional driving device.

FIG. 7 shows another schematic diagram of a conventional driving device. The conventional driving device as shown in FIG. 7 is substantially the same as that of the driving device in FIG. 6, except that the first inputs $a_{2n}$ (n=1, 3, 5, ..., (2n−1)) of the primary windings of the transformers $T_{2n}$ (n=1, 3, 5, ..., (2n−1)) and the second inputs $b_{2n}$ (n=2, 4, 6, ..., 2n) of the primary windings of the transformers $T_{2n}$ (n=2, 4, 6, ..., 2n) are jointly connected to one output of the power stage circuit 20, and the second inputs $b_{2n}$ (n=1, 3, 5, ..., (2n−1)) of the primary windings of the transformers $T_{2n}$ (n=1, 3, 5, ..., (2n−1)) and the first inputs $a_2$ (n=2, 4, 6, ..., 2n) of the primary windings of the transformers $T_{2n}$ (n=2, 4, 6, ..., 2n) are jointly connected to another output of the power stage circuit 20.

In the conventional driving device of FIG. 7, voltage values output from two adjacent lamps $L_{1n}$ (n=1, 2, 3, ..., n) are the same magnitude, but 180 degrees out of phase. Consequently, currents flowing through the lamps $L_{1n}$ (n=1, 2, 3, ..., n) are balanced such that illumination of the LCD panel is consistent. However, arcing may occur between adjacent lamps, due to high voltage differences. In order to avoid arcing, distance between the circuitries should be increased or holes formed in the circuit board.

However, increased distance between lamps, increases the size of the circuit board, and holes in the circuit board reduce physical integrity of the circuit board.

SUMMARY

One aspect of the present invention provides a driving device for driving a light source module including a first power stage circuit and a first transformer circuit. The first power stage circuit includes a positive output and a negative output. The first transformer circuit, connected to the first power stage circuit, includes a first transformer, a second transformer, a third transformer, and a fourth transformer. The first transformer includes a primary winding. The second transformer includes a primary winding. The third transformer includes a primary winding. The fourth transformer includes a primary winding. Each primary winding has a first input and a second input. The first input of the primary winding of the first transformer, the second input of the primary winding of the second transformer, the second input of the primary winding of the third transformer, and the first input of the primary winding of the fourth transformer are jointly connected to the positive output of the first power stage circuit. The second input of the primary winding of the first transformer, the first input of the primary winding of the second transformer, the first input of the primary winding of the third transformer, and the second input of the primary winding of the fourth transformer are jointly connected to the negative output of the first power stage circuit.

Another aspect of the present invention provides a driving device for driving a plurality of light source modules includes a first power stage circuit and a plurality of first transformer circuits. The first power stage circuit includes a positive output and a negative output. The first transformer circuits are connected to the first power stage circuit. Each of the first transformer circuits includes a first transformer, a second transformer, a third transformer, and a fourth transformer. The first transformer includes a primary winding. The second transformer includes a primary winding. The third transformer includes a primary winding. The fourth transformer includes a primary winding. Each of the primary windings has a first input and a second input. The first input of the primary winding of the first transformer, the second input of the primary winding of the second transformer, the second input of the primary winding of the third transformer, and the first input of the primary winding of the fourth transformer are jointly connected to the positive output of the first power stage circuit. The second input of the primary winding of the first transformer, the first input of the primary winding of the second transformer, the first input of the primary winding of the third transformer, and the second input of the primary winding of the fourth transformer are jointly connected to the negative output of the first power stage circuit.

Other advantages and novel features will become more apparent from the following detailed description when taken in conjunction with the accompanying drawings, in which:

DETAILED DESCRIPTION OF EMBODIMENTS

Figure 1:
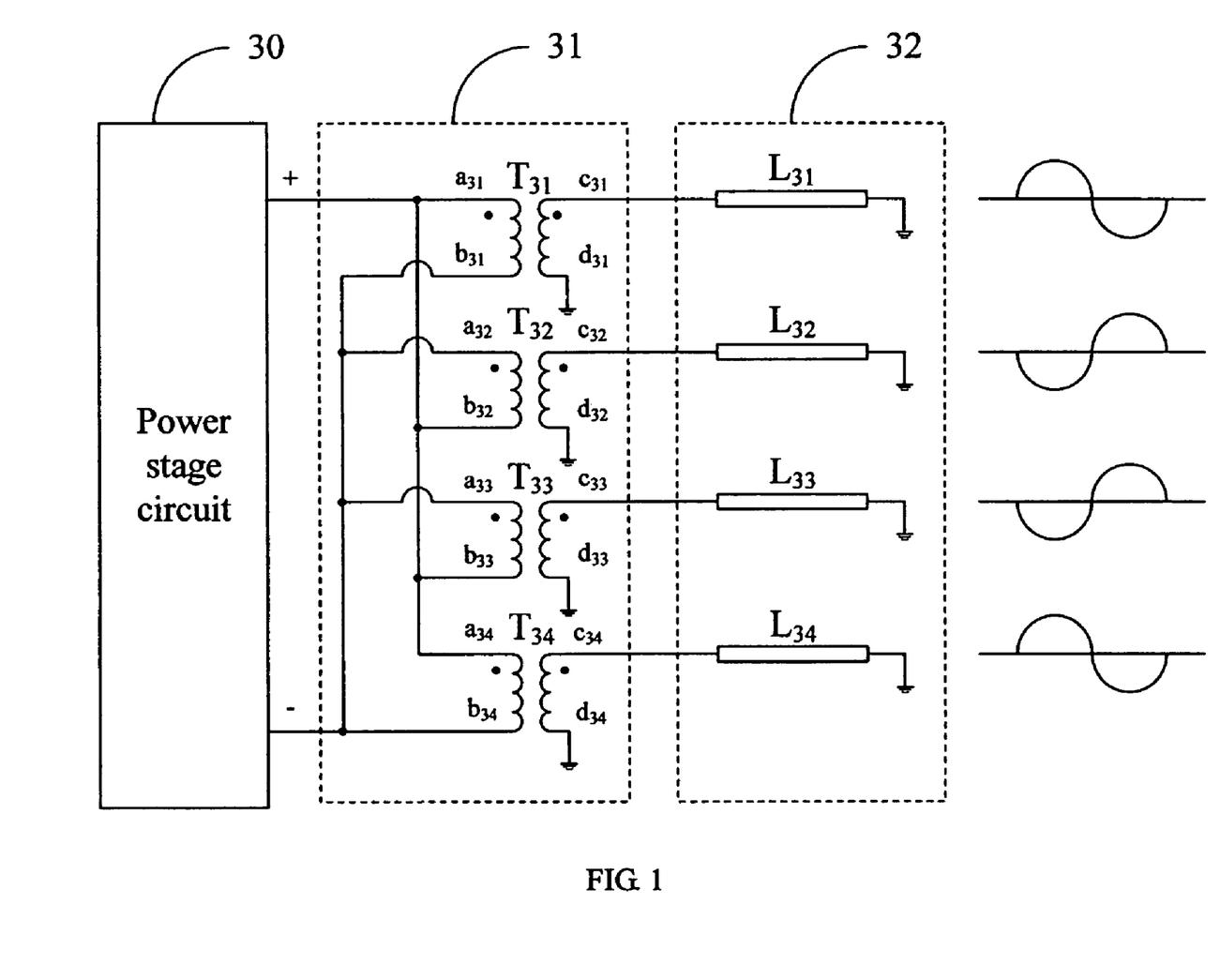
FIG. 1 is a schematic diagram of a driving device of a first exemplary embodiment of the present invention.

FIG. 1 is a schematic diagram of a driving device of a first exemplary embodiment of the present invention. The driving device for driving a light source module 32 includes a power stage circuit 30 and a transformer circuit 31. The power stage circuit 30 includes a positive output and a negative output. The transformer circuit 31 includes a first transformer $T_{31}$, a second transformer $T_{32}$, a third transformer $T_{33}$, and a fourth transformer $T_{34}$. The light source module 32 includes a plurality of light sources/lamps $L_{31}$, $L_{32}$, $L_{33}$, $L_{34}$.

The first transformer $T_{31}$, the second transformer $T_{32}$, the third transformer $T_{33}$, and the fourth transformer $T_{34}$ respectively includes a primary winding and a secondary winding. Each primary winding correspondingly has a first input $a_{3n}$ (n=1, 2, 3, 4) and a second input $b_{3n}$ (n=1, 2, 3, 4), and each secondary winding correspondingly has a first output $c_{3n}$ (c=1, 2, 3, 4) and a second output $d_{3n}$ (n=1, 2, 3, 4). In the exemplary embodiment, the first outputs $c_{3n}$ (c=1, 2, 3, 4) of the secondary windings are high voltage terminals, and the second outputs $d_{3n}$ (n=1, 2, 3, 4) of the secondary windings are low voltage terminals.

The first input $a_{31}$ of the primary winding of the first transformer $T_{31}$, the second input $b_{32}$ of the primary winding of the second transformer $T_{32}$, the second input $b_{33}$ of the primary winding of the third transformer $T_{33}$, and the first input $a_{34}$ of the primary winding of the fourth transformer $T_{34}$ are jointly connected to the positive output of the power stage circuit 30. The second input $b_{31}$ of the primary winding of the first transformer $T_{31}$, the first input $a_{32}$ of the primary winding of the second transformer $T_{32}$, the first input $a_{33}$ of the primary winding of the third transformer $T_{33}$, and the second input $b_{34}$ of the primary winding of the fourth transformer $T_{34}$ are jointly connected to the negative output of the power stage circuit 30.

In addition, the first outputs $C_{3n}$ (n=1, 2, 3, 4) of the secondary windings of the first transformer $T_{31}$, the second transformer $T_{32}$, the third transformer $T_{33}$, and the fourth transformer $T_{34}$ are respectively connected to one end of the lamps $L_{3n}$ (n=1, 2, 3, 4), and the second outputs $d_{3n}$ (n=1, 2, 3, 4) of the secondary windings of the first transformer $T_{31}$, the second transformer $T_{32}$, the third transformer $T_{33}$, and the fourth transformer $T_{34}$ are grounded. The other ends of the lamps $L_{3n}$ (n=1, 2, 3, 4) are also grounded.

Consequently, voltages to the lamp $L_{31}$ and the lamp $L_{34}$ are positive and of the same magnitude and phase. Voltages to the lamp $L_{32}$ and the lamp $L_{33}$ are negative and are also of the same magnitude and phase.

Figure 2:
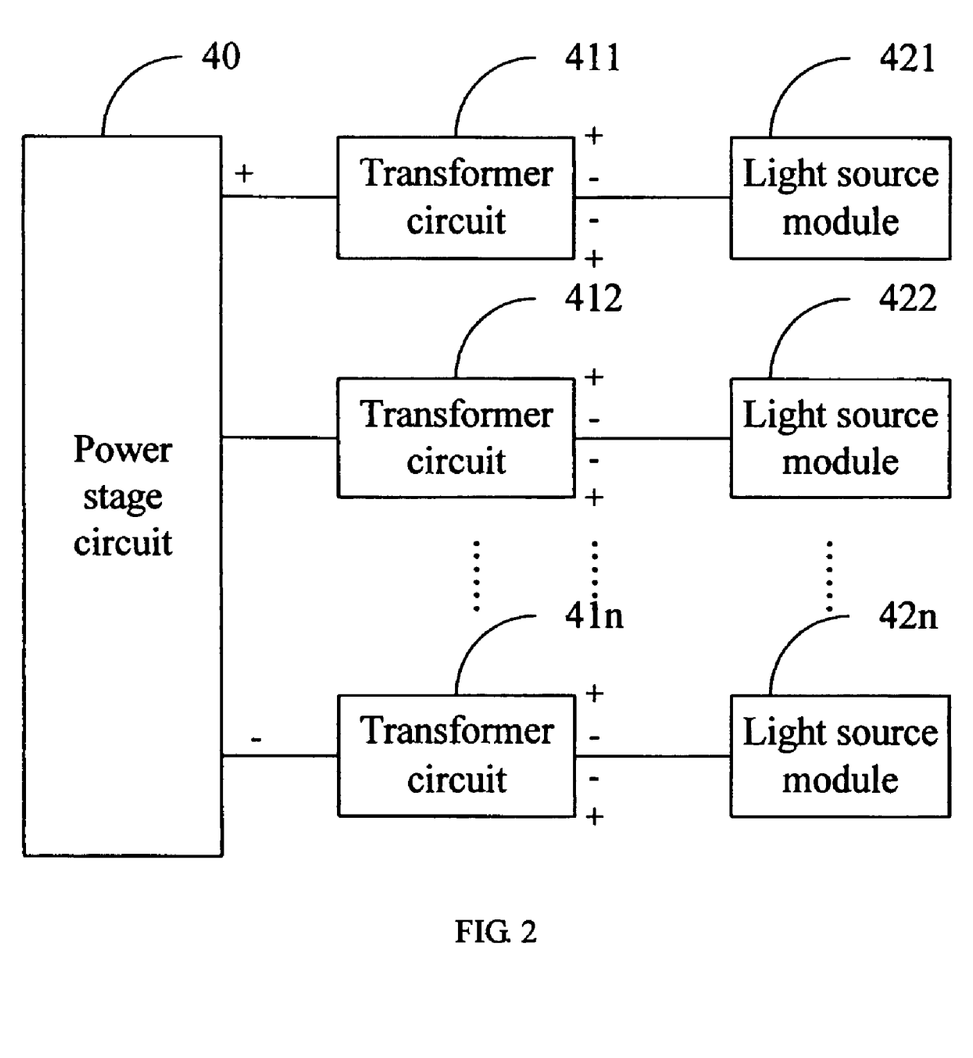
FIG. 2 is a schematic diagram of a driving device of a second exemplary embodiment of the present invention.

FIG. 2 is a schematic diagram of a driving device of a second exemplary embodiment of the present invention. In the exemplary embodiment, the driving device drives a plurality of light source modules $42n$ (n=1, 2, 3, ..., n), and includes a power stage circuit 40, and a plurality of transformer circuits $41n$ (n=1, 2, 3, ..., n). The transformer circuits $41n$ (n=1, 2, 3, ..., n) have the same structures as those of the transformer circuit 31 of FIG. 1, and the transformer circuits $41n$ (n=1, 2, 3, ..., n) and the light source modules $42n$ (n=1, 2, 3, ..., n) have similar connections to those of the transformer circuit 31 and the light source module 32 of FIG. 1, and thus descriptions thereof are omitted.

In the exemplary embodiment, in the first transformer circuits $41n$ (n=1, 2, 3, ..., n), one of the output voltage polarities, except the first or the last one, is the same as one of two adjacent output voltage polarities, and is opposite to the other one of two adjacent output voltage polarities. In the exemplary embodiment, the first and the last output voltage polarities are both positive. In alternative exemplary embodiments, the first and the last output voltage polarities are both negative.

Figure 3:
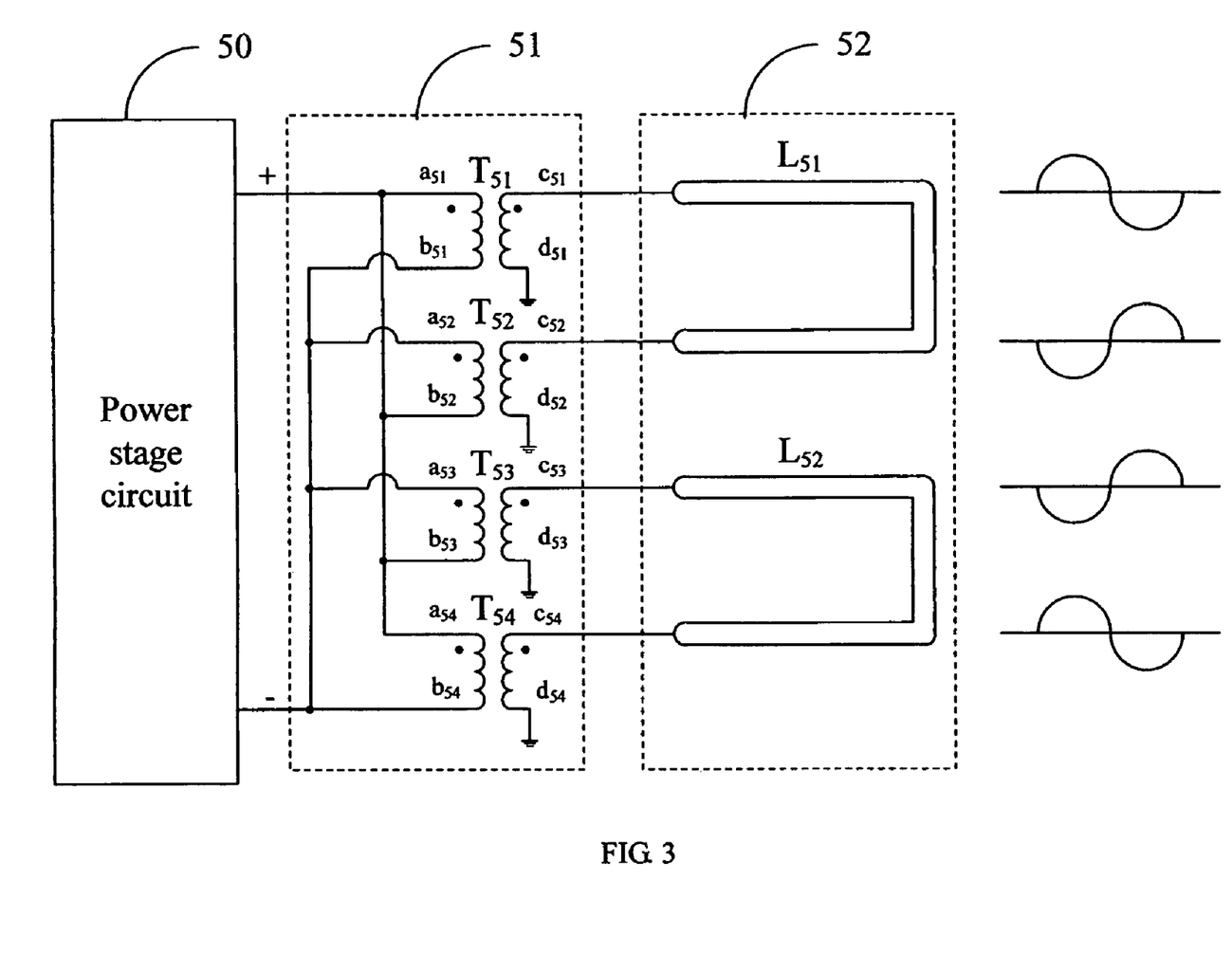
FIG. 3 is a schematic diagram of a driving device of a third exemplary embodiment of the present invention.

FIG. 3 is a schematic diagram of a driving device of a third exemplary embodiment of the present invention. The driving device as shown in FIG. 3 is substantially the same as that of FIG. 1, except that the light source module 52 includes a first lamp $L_{51}$ and a second lamp $L_{52}$, which are U-shaped lamps. One end of the first lamp $L_{51}$ is connected to the first output $c_{51}$ of the secondary winding of the first transformer $T_{51}$, and the other end of the first lamp $L_{51}$ is connected to the first output $c_{52}$ of the secondary winding of the second transformer $T_{52}$. One end of the second lamp $L_{52}$ is connected to the first output $c_{53}$ of the secondary winding of the third transformer $T_{53}$, and the other end of the second lamp $L_{52}$ is connected to the first output $c_{54}$ of the secondary winding of the fourth transformer $T_{54}$.

When the driving device drives a plurality of U-shaped lamps, the present invention is the same as that of the FIG. 2; that is, the transformer circuits $41n$ (n=1, 2, 3, ..., n) and the light source modules $42n$ (n=1, 2, 3, ..., n) of FIG. 2 have similar connections to those of the transformer circuit 51 and the light source module 52 of FIG. 3, and further description is omitted.

Figure 4:
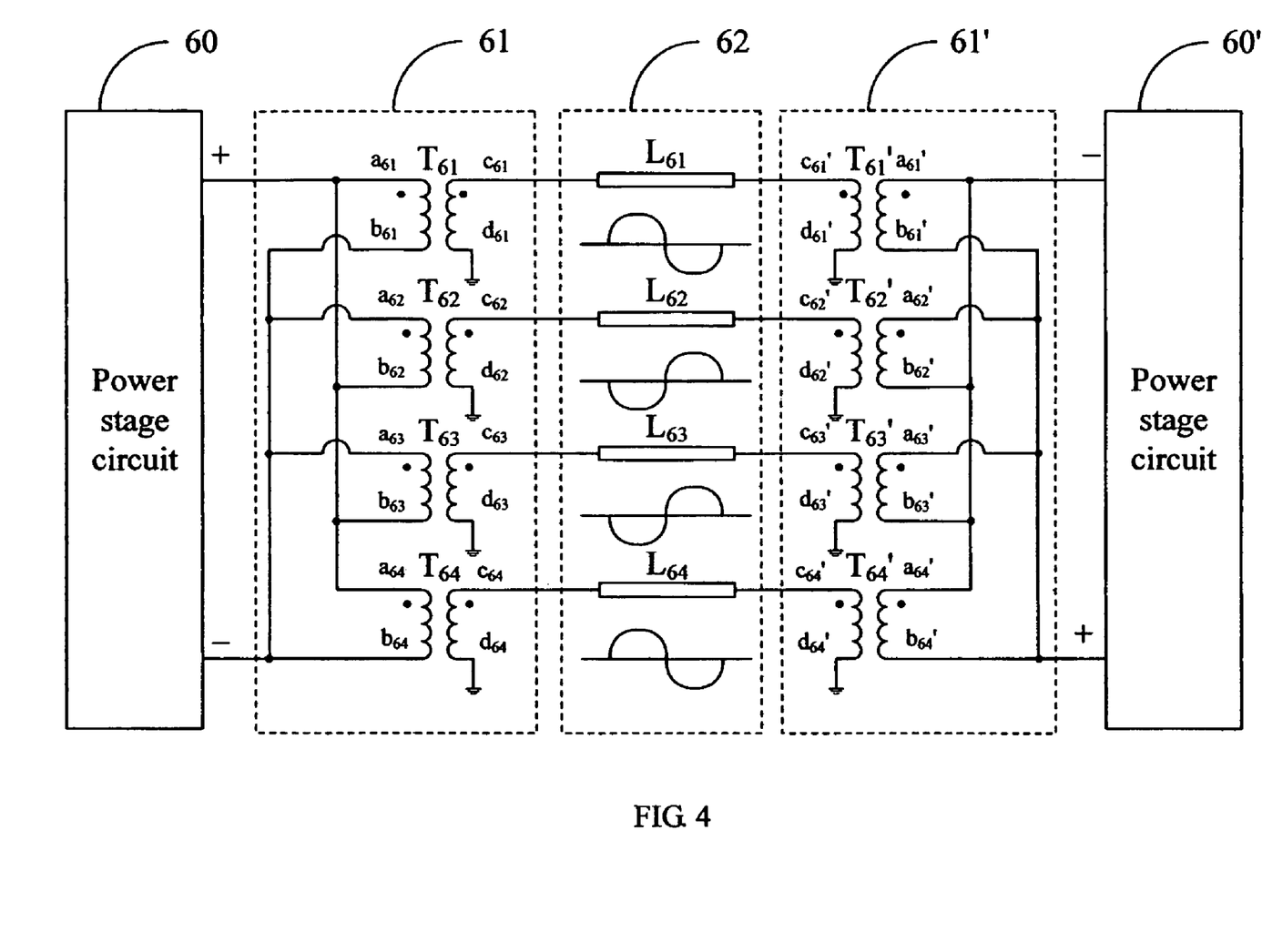
FIG. 4 a schematic diagram of is a driving device of a fourth exemplary embodiment of the present invention.

FIG. 4 is a schematic diagram of a driving device of a fourth exemplary embodiment of the present invention. The driving device includes two power stage circuits 60, 60', two transformer circuits 61, 61', and a light source module 62. The power stage circuit 60 and the transformer circuit 61 have similar connections to those of the power stage circuit 30 and the transformer circuit 31 as shown in FIG. 1; and the transformer circuit 61 and the light source module 62 have similar connections to those of the transformer circuit 31 and the light source module 32. Similarly, the power stage circuit 60' and the second transformer circuit 61' have similar connections to those of the power stage circuit 30 and the transformer circuit 31 as shown in FIG. 1; and the transformer circuit 61' and the light source module 62 have similar connections to those of the transformer circuit 31 and the light source module 32.

The transformer 61' includes a fifth transformer $T_{61}'$, a sixth transformer $T_{62}'$, a seventh transformer $T_{63}'$, and an eighth transformer $T_{64}'$. The first input $a_{61}'$ of the primary winding of the fifth transformer $T_{61}'$ is connected to a negative output of the power stage circuit 60', and the second input $b_{64}'$ of the primary winding of the eighth transformer $T_{64}'$ is connected to a positive output of the power stage circuit 60'.

Figure 5:
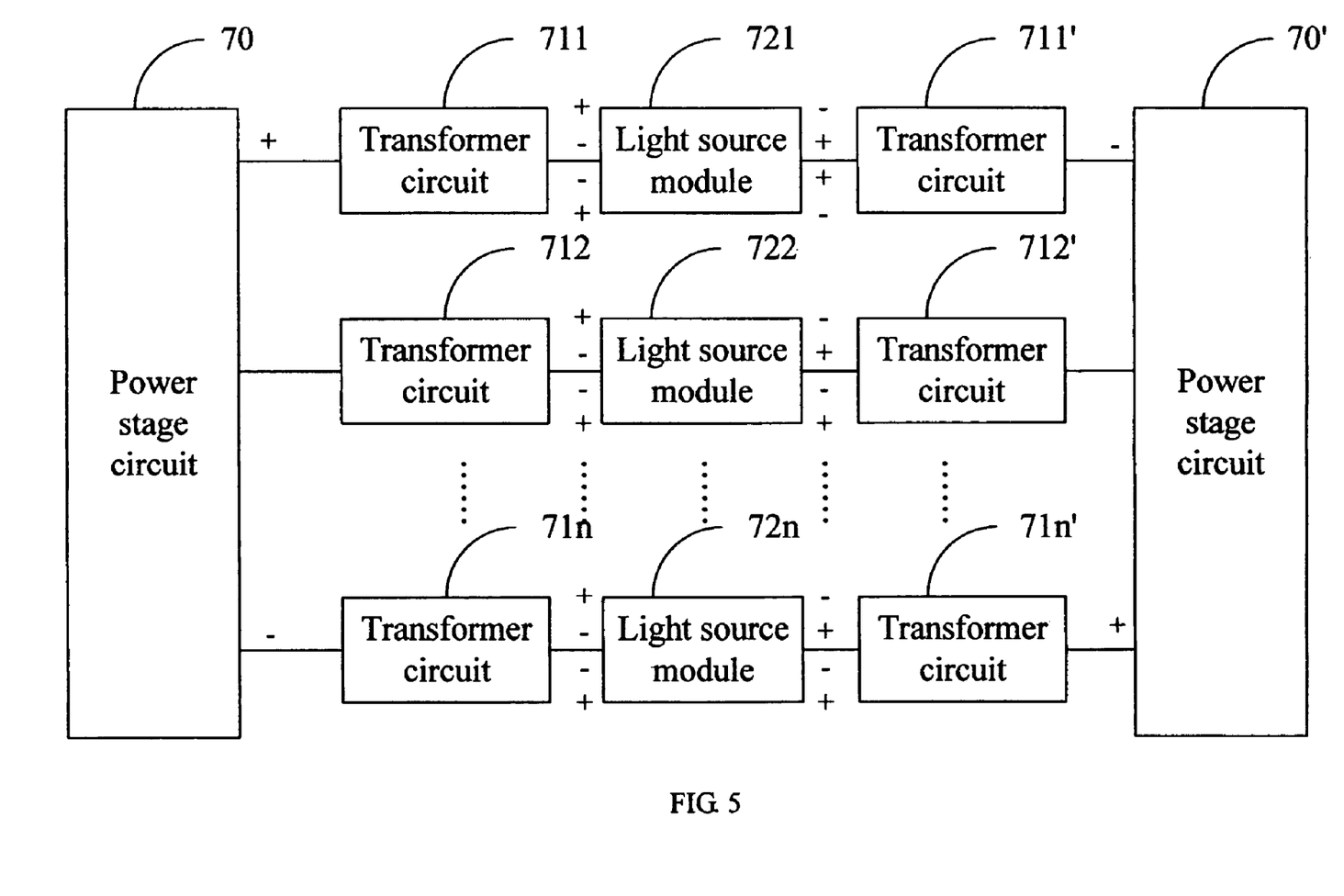
FIG. 5 is a schematic diagram of a driving device of a fifth exemplary embodiment of the present invention.

FIG. 5 is a schematic diagram of a driving device of a fifth exemplary embodiment of the present invention. The driving device includes two power stage circuit 70, 70', a plurality of transformer circuits $71n$ (n=1, 2, 3, ..., n), $71n'$ (n=1, 2, 3, ... n), and a plurality of light source modules $72n$ (n=1, 2, 3, ..., n). The transformer circuits $71n$ (n=1, 2, 3, ..., n) and $71n'$ (n=1, 2, 3, ..., n) have similar structures to those of the transformer circuit 61 and 61' as shown in FIG. 4. The transformer circuits $71n$ (n=1, 2, 3, ..., n) and the light source modules $72n$ (n=1, 2, 3, ..., n) have similar connections to those of the transformer circuit 61 and the light source module 62 as shown in FIG. 4; and the light source modules $72n$ (n=1, 2, 3, ..., n) and the transformer circuits $71n'$ (n=1, 2, 3, ..., n) have similar connections to those of the light source module 62 and the transformer circuit 61'.

Similarly, in the exemplary embodiment, in the transformer circuits $71n$ (n=1, 2, 3, ..., n) and $71n'$ (n=1, 2, 3, ..., n), one of output voltage polarities, except the first or the last one, is the same as one of two adjacent output voltage polarities, and is opposite to the other one of two adjacent output voltage polarities.

In the exemplary embodiment, in the first transformer circuits $71n$ (n=1, 2, 3, ..., n), the first and the last output voltage polarities are both positive; and in the second transformer circuits $71n'$ (n=1, 2, 3, ..., n), the first and the last output voltage the polarities are both negative. In alternative exemplary embodiments, the first and last output voltage polarities in the transformer circuits $71n$ (n=1, 2, 3, ..., n) and $71n'$ (n=1, 2, 3, ..., n) can be exchanged. That is, the first and last output voltage polarities in the transformer circuits $71n$ (n=1, 2, 3, ..., n) are both negative; and the first and last output voltage polarities in the transformer circuits $71n'$ (n=1, 2, 3, ..., n) are both positive.

In the present invention, output voltages polarities are arranged in an array in the transformer circuit to ensure that currents flowing through the lamps are balanced, and to ensure that voltage difference between some adjacent lamps are zero. Therefore, arcing is avoided. In addition, distance between two adjacent lamps is reduced, and thus area of a circuit board is reduced and the driving device has lower cost.

While various embodiments and methods of the present invention have been described above, it should be understood that they have been presented by way of example only and not by way of limitation. Thus the breadth and scope of the present invention should not be limited by the above-described exemplary embodiments, but should be defined only in accordance with the following claims and their equivalent.

I claim:

1. A driving device for driving a light source module comprising a plurality of lamps, comprising:
   a first power stage circuit, comprising a positive output and a negative output; and
   a first transformer circuit, connected to the first power stage circuit, comprising:
   a first transformer comprising a primary winding;
   a second transformer comprising a primary winding;
   a third transformer comprising a primary winding; and
   a fourth transformer comprising a primary winding;
   wherein each primary winding has a first input and a second input; the first input of the primary winding of the first transformer, the second input of the primary winding of the second transformer, the second input of the primary winding of the third transformer, and the first input of the primary winding of the fourth transformer are jointly connected to the positive output of the first power stage circuit; and the second input of the primary winding of the first transformer, the first input of the primary winding of the second transformer, the first input of the primary winding of the third transformer, and the second input of the primary winding of the fourth transformer are jointly connected to the negative output of the first power stage circuit.

2. The driving device as claimed in claim 1, wherein the first transformer, the second transformer, the third transformer, and the fourth transformer respectively further comprise a secondary winding, and each secondary winding has a first output and a second output.

3. The driving device as claimed in claim 2, wherein the first outputs are high voltage terminals, and the second outputs are low voltage terminals.

4. The driving device as claimed in claim 2, wherein the second outputs are grounded.

5. The driving device as claimed in claim 4, wherein one end of each lamp is respectively connected to the first output of the secondary winding of the corresponding transformer of the first transformer circuit, and the other end of each lamp is grounded.

6. The driving device as claimed in claim 4, wherein the light source module comprises a first lamp and a second lamp, one end of the first lamp is connected to the first output of the secondary winding of the first transformer, and the other end of the first lamp is connected to the first output of the secondary winding of the second transformer; one end of the second lamp is connected to the first output of the secondary winding of the third transformer, and the other end of the second lamp is connected to the first output of the secondary winding of the fourth transformer.

7. The driving device as claimed in claim 6, wherein the first lamp and the second lamp are U-shaped lamps.

8. The driving device as claimed in claim 4, further comprising:
   a second power stage circuit, comprising a positive output and a negative output; and
   a second transformer circuit, connected to the second power stage circuit, comprising:
   a fifth transformer comprising a primary winding;
   a sixth transformer comprising a primary winding;
   a seventh transformer comprising a primary winding; and
   an eighth transformer comprising a primary winding;
   wherein each primary winding has a first input and a second input; the first input of the primary winding of the fifth transformer, the second input of the primary winding of the sixth transformer, the second input of the primary winding of the seventh transformer and the first input of the primary winding of the eighth transformer are jointly connected to the negative output of the second power stage circuit; and the second input of the primary winding of the fifth transformer, the first input of the primary winding of the sixth transformer, the first input of the primary winding of the seventh transformer and the second input of the primary winding of the eighth transformer are jointly connected to the positive output of the second power stage circuit.

9. The driving device as claimed in claim 8, wherein each lamp is connected between the first output of the secondary winding of the respective transformer of the first transformer circuit and the first output of the secondary winding of the respective transformer of the second transformer circuit.

10. A driving device for driving a plurality of light source modules, comprising:
    a first power stage circuit, comprising a positive output and a negative output; and
    a plurality of first transformer circuits, connected to the first power stage circuit, each of the plurality of first transformer circuits comprising:
    a first transformer comprising a primary winding;
    a second transformer comprising a primary winding;
    a third transformer comprising a primary winding; and
    a fourth transformer comprising a primary winding;
    wherein each primary winding has a first input and a second input; the first input of the primary winding of the first transformer, the second input of the primary winding of the second transformer, the second input of the primary winding of the third transformer, and the first input of the primary winding of the fourth transformer are jointly connected to the positive output of the first power stage circuit; and the second input of the primary winding of the first transformer, the first input of the primary winding of the second transformer, the first input of the primary winding of the third transformer, and the second input of the primary winding of the fourth transformer are jointly connected to the negative output of the first power stage circuit.

11. The driving device as claimed in claim 10, wherein the first transformer, the second transformer, the third transformer, and the fourth transformer respectively further comprises a secondary winding, and each secondary winding has a first output and a second output.

12. The driving device as claimed in claim 11, wherein the first outputs are high voltage terminals, and the second outputs are low voltage terminals.

13. The driving device as claimed in claim 11, wherein the second outputs are grounded.

14. The driving device as claimed in claim 13, wherein one end of each lamp is connected to the output of the secondary winding of the respective transformer of the first transformer circuits, and the other end of each lamp is grounded.

15. The driving device as claimed in claim 13, wherein each light source module comprises a first lamp and a second lamp, one end of the first lamp is connected to the first output of the secondary winding of the first transformer, and the other end of the first lamp is connected to the first output of the secondary winding of the second transformer; one end of the second lamp is connected to the first output of the secondary winding of the third transformer, and the other end of the second lamp is connected to the first output of the secondary winding of the fourth transformer.

16. The driving device as claimed in claim 15, wherein the first lamp and the second lamp are U-shaped lamps.

17. The driving device as claimed in claim 13, further comprising:
a second power stage circuit, comprising a positive output and a negative output; and
a plurality of second transformer circuits, connected to the second power stage circuit, comprising:
a fifth transformer comprising a primary winding;
a sixth transformer comprising a primary winding;
a seventh transformer comprising a primary winding; and
an eighth transformer comprising a primary winding;
wherein each primary winding has a first input and a second input; the first input of the primary winding of the fifth transformer, the second input of the primary winding of the sixth transformer, the second input of the primary winding of the seventh transformer, and the first input of the primary winding of the eighth transformer are jointly connected to the negative output of the second power stage circuit; and the second input of the primary winding of the fifth transformer, the first input of the primary winding of the sixth transformer, the first input of the primary winding of the seventh transformer, and the second input of the primary winding of the eighth transformer are jointly connected to the positive output of the second power stage circuit.

18. The driving device as claimed in claim 17, wherein each lamp is connected between the first output of the secondary winding of the respective transformer of the plurality of first transformer circuits and the first output of the secondary winding of the respective transformer of the plurality of second transformer circuits.

19. An assembly comprising:
a plurality of light sources arranged side by side; and
a plurality of transformers electrically connectable to said plurality of light sources, respectively, and correspondingly arranged side by side, each of said plurality of transformers able to accept input power and transform said input power to output power for powering a corresponding one of said plurality of light sources, said each of said plurality of transformers comprising a first output thereof to electrically connect to said corresponding one of said plurality of light sources for transmitting said output power to said corresponding one of said plurality of light sources, and a second output thereof to be grounded, said output power through said first output of said each of said plurality of transformers being in a same power phase as a neighboring one of said plurality of transformers, and being in an opposite power phase to another neighboring one of said plurality of transformers, an input connection of said each of said plurality of transformers being same as an input connection of said neighboring one of said plurality of transformers, and being different from an input connection of said another neighboring one of said plurality of transformers.

20. The assembly as claimed in claim 19, wherein said each of said plurality of transformers comprising a first input and a second input for said input connection thereof, said first input of said each of said plurality of transformers, a first input of said neighboring one of said plurality of transformers and a second input of said another neighboring one of said plurality of transformers are electrically connected to a positive output of a power stage circuit, said second input of said each of said plurality of transformers, a second input of said neighboring one of said plurality of transformers and a first input of said another neighboring one of said plurality of transformers are electrically connected to a negative output of said power stage circuit.

* * * * *